(12) United States Patent
Fogg

(10) Patent No.: US 11,054,720 B1
(45) Date of Patent: Jul. 6, 2021

(54) SLIDING MINIATURE LENS COVER

(71) Applicant: Handstands Promo, LLC., Salt Lake City, UT (US)

(72) Inventor: Jason Fogg, West Valley, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 246 days.

(21) Appl. No.: 16/399,124

(22) Filed: Apr. 30, 2019

Related U.S. Application Data

(60) Provisional application No. 62/665,025, filed on May 1, 2018.

(51) Int. Cl.
*G03B 11/04* (2021.01)
*G06F 1/16* (2006.01)

(52) U.S. Cl.
CPC .......... *G03B 11/043* (2013.01); *G06F 1/1686* (2013.01)

(58) Field of Classification Search
CPC ............................. G03B 11/043; G06F 1/1686
USPC ......................................................... 359/227
See application file for complete search history.

(56) References Cited

U.S. PATENT DOCUMENTS

| | | |
|---|---|---|
| D669,112 S | 10/2012 | Gustaveson, II |
| D708,657 S | 7/2014 | Gustaveson |
| D721,396 S | 1/2015 | Gustaveson, II |
| D763,843 S | 8/2016 | Gustaveson, II |
| D782,562 S | 3/2017 | Gustaveson, II |
| 9,829,770 B1 | 11/2017 | Gusaveson, II |
| D807,947 S | 1/2018 | Gustaveson, II |
| D808,457 S | 1/2018 | Gustaveson, II |
| D810,180 S | 2/2018 | Gustaveson, II |
| 10,015,296 B1 | 7/2018 | Haymond |
| D836,154 S | 12/2018 | Gustaveson, II |
| D849,123 S | 5/2019 | Gustaveson, II |
| 10,317,776 B2 | 6/2019 | Gustaveson, II |
| 2015/0015777 A1 | 1/2015 | Osborne |
| 2015/0070575 A1 | 3/2015 | Lee et al. |
| 2018/0059510 A1* | 3/2018 | Gustaveson, II .... H04N 5/2257 |
| 2019/0179212 A1 | 6/2019 | Leimer |

FOREIGN PATENT DOCUMENTS

| | | |
|---|---|---|
| WO | WO DM/095 351 | 9/2016 |
| WO | WO DM/095 613 | 9/2016 |

OTHER PUBLICATIONS

Targus, "Spy Guard Webcam Cover", http://www.tagus.com/us/spy-guard-webcam-cover-3-pack-awh012us As accessed on this date: Dec. 14, 2017.
Hit Promotional Products, "#265 Security Webcam Cover", https://www.bitpromo.net/product/show/265/security-webcam-cover As accessed on this date: Dec. 14, 2017.

* cited by examiner

*Primary Examiner* — Euncha P Cherry
(74) *Attorney, Agent, or Firm* — Thorpe, North & Western, LLP

(57) ABSTRACT

A lens cover selectively covers and exposes a camera lens on a mobile device, such as a cellular phone, laptop or tablet. The lens cover can be adhered to the mobile device. The lens cover has a slider that slides between an open position and a closed position. Indicium is disposed on the exposed face of the slider that is indicative of or representing a business, a product, or both. The base and the slider have perimeters with a length less than approximately 20 mm and a height less than or equal to 8 mm, and/or a ratio of approximately 19:8.

20 Claims, 2 Drawing Sheets

SLIDING MINIATURE LENS COVER

PRIORITY CLAIM(S)

Priority is claimed to U.S. Provisional Patent Application Ser. No. 62/665,025, filed May 1, 2018, which is hereby incorporated herein by reference.

BACKGROUND

Field of the Invention

The present invention relates generally to a lens cover for a mobile device, such as a cellular phone or laptop computer or table computer.

Related Art

Many devices, such as cellular phones, laptop computers and tablet computers, have cameras with a camera lens. The mobility and frequent handling of such devices raises concerns over fouling the camera lens with fingerprints, etc. In addition, the ubiquity of cellular phones, and their cameras, raises concerns about privacy.

SUMMARY OF THE INVENTION

It has been recognized that it would be advantageous to develop a lens cover for a camera lens for mobile devices, such as cellular phones, to protect the lens and maintain privacy.

The invention provides a lens cover to selectively cover and expose a camera lens on a mobile device. The lens cover comprises a base with an inner side to be affixed to a back of the mobile device. The base also has an opening to be aligned with the camera lens of the mobile device. A slider is slidably coupled to the base and disposed on top of the base. The slider has an exposed face and an interior face abutting to the base. The slider slides with respect to the base between two positions, comprising: an open position to expose the camera lens; and a closed position to cover the camera lens. In one aspect, a pair of undercuts oppose one another on opposite sides of the opening of the base. A pair of separate and discrete tabs is spaced-apart from one another and extends from the interior face of the slider and into the pair of undercuts of the base. In another aspect, indicia is disposed on the exposed face of the slider. The indicia is indicative of or representing a business, a product, or both. In another aspect, the base and the slider have perimeters with a length less than approximately 20 mm and a height less than or equal to 8 mm, and/or a ratio of approximately 19:8.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
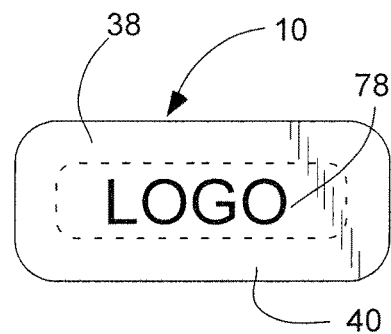
FIG. 1 is a front view of a lens cover in accordance with an embodiment of the present invention, and shown in a closed position.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "handheld electronic device" and "mobile device" are used interchangeably herein to refer broadly to a portable, hand-held electronic device, including by way of example, a cellular (cell) phone, a smart phone, a tablet computer or tablet, a phablet, a global positioning system (GPS), a mobile media player, a gaming system, a video monitor, and the like. The handheld electronic device can be a cell phone; an MP3 player (iPod® or the like) or other digital music player; a gaming device (Nintendo® DS; PSP®; etc.); a camera; a global positioning system (GPS) system; a personal digital assistant (PDA); a DVD player; a portable television; a digital camera; a video camera; a portable computer (laptop computer, iPad®, or the like); an e-book or e-reader (Kindle®, Nook®, iPad®, Sony Reader™, or the like), etc. Such a device can have a display screen upon which data, information, media, etc. is viewed; one or more inputs, such as buttons, a touch screen, etc.; one or more outputs, such as the screen, a speaker, an audio jack, etc.; one or more cameras; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. The portable electronic device can be mobile and transportable. The portable electronic device can be carried by a user, such as in a pocket or purse, and also can be held in the user's hand(s).

The term "cellular phone" is used broadly herein to refer to a cellular phone, a cell phone, a smart phone, phablet, etc. Such cellular phones can be portable, handheld communication devices, or mobile devices, that can include a speaker, a microphone, one or more cameras, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone.

In addition, the terms "mobile device" and "cellular phone" are intended to refer to such mobile devices and cellular phones with a case, cover, skin, film, etc. thereon. Cell phones often are used with a case that surrounds the sides and back of the phone. In addition, cell phones can be utilized with skins that adhere or stick to the back and/or sides of the phone. The term "cell phone" is used herein to also refer to such cases or skins. Thus, a description of an item being attached to, affixed to, carried by, and the like, the cell phone or back thereof is intended to include being attached to, affixed to, carried by, and the like, the case or skin or back thereof. Furthermore, the terms "back surface"

and "back" are used interchangeably for such mobile devices or cellular phones, and are intended to refer to the actual back or back surface of such devices, and the back or back surface of any case, cover, skin, film, etc. disposed thereon.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both.

DESCRIPTION

A lens cover is provided to selectively cover and expose a camera or camera lens on the back of mobile device, such as a cellular phone, laptop computer or tablet computer. The lens cover can be adhered to the back of the mobile device, or case or skin thereof, or the front of the laptop or tablet computer, and around the camera lens thereof. The lens cover has slider that slides on a base or base ring, and between an open position and a closed position. The slider and the base can have matching perimeters. The lens cover, or the base and the slider, can be sized to accommodate limited available space with respect to the mobile device.

Figure 4:
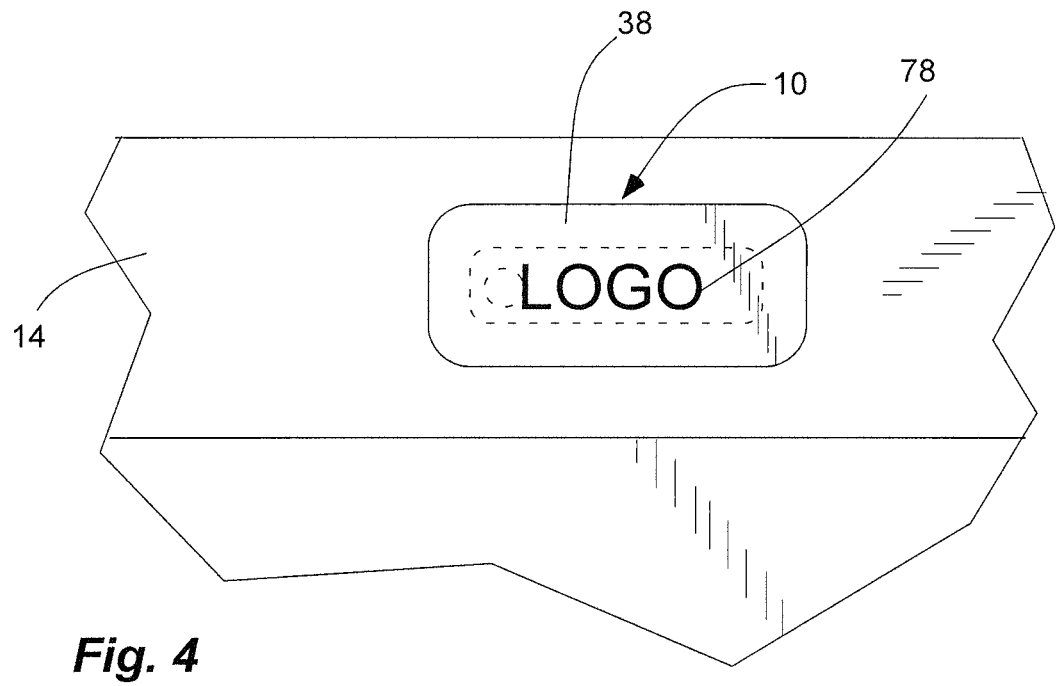
FIG. 4 is a front view of the lens cover of FIG. 1, shown on a mobile device, and shown in the closed position.
Figure 5:
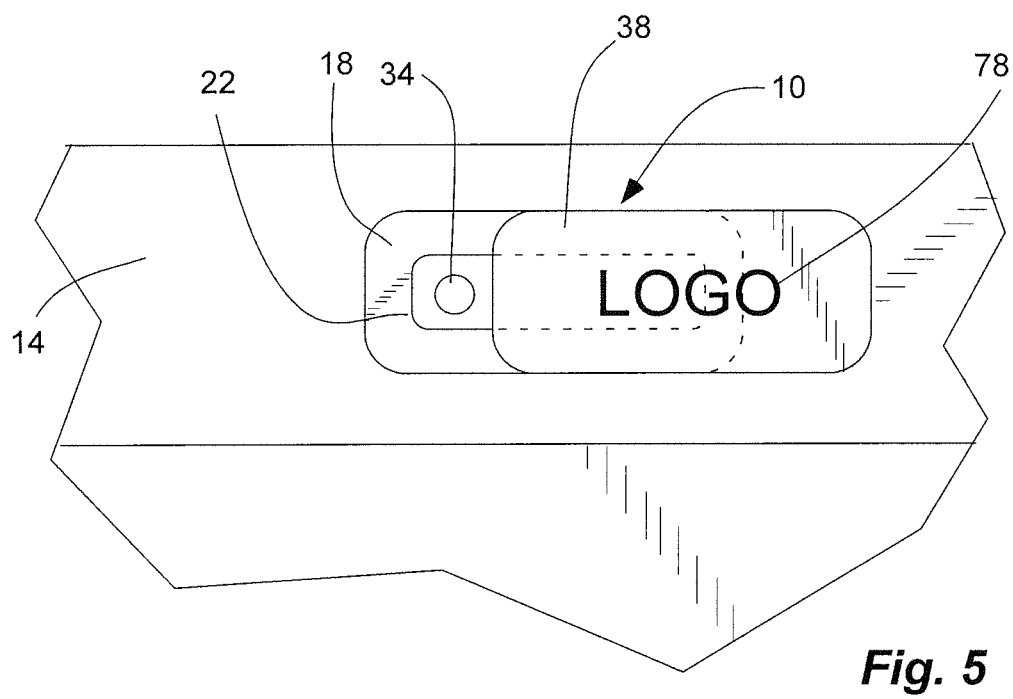
FIG. 5 is a front view of the lens cover of FIG. 1, shown on a mobile device, and shown in the open position.

As illustrated in FIGS. 1-5, a lens cover, indicated generally at 10, in an example implementation in accordance with the invention is shown for use with a mobile device 14, such as a cellular phone, a laptop computer, or a tablet computer. The lens cover 10 comprises a base 18 or a base ring with an opening 22. The base 18 or ring base can have an elongated, rectangular, annular shape. The base 18 or base ring and the opening 22 can be sized to surround one or more cameras or camera lenses 34 adjacent one another on the mobile device 14. The base 18 has an inner side and an opposite outer side. The inner side can have an adhesive thereon, or an adhesive layer, to affix the base 18 to the mobile device 14, or case or skin thereof. In one aspect, the adhesive can be a releasable 3M adhesive. In one aspect, the base 18 can be positioned or located on the mobile device 14 with the opening 22 over the camera lens 34, and with the base 18 or base ring circumscribing the camera lens 34, or lenses, as shown in FIG. 5. In addition, the base 18 or base ring can have a pair of undercuts 36 opposing one another on opposite sides of the opening 22 of the base. The base 18 can be formed of plastic and can be formed by injection molding.

Figure 2:
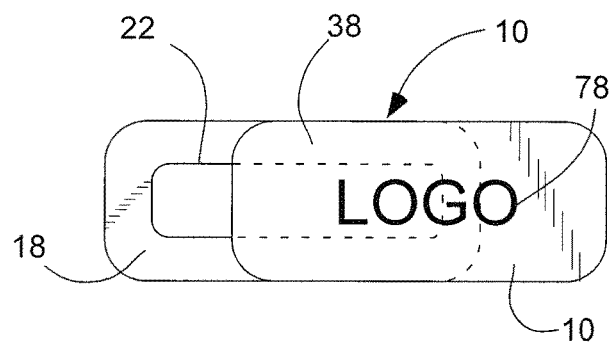
FIG. 2 is a front view of the lens cover of FIG. 1, shown in an open position.
Figure 3:
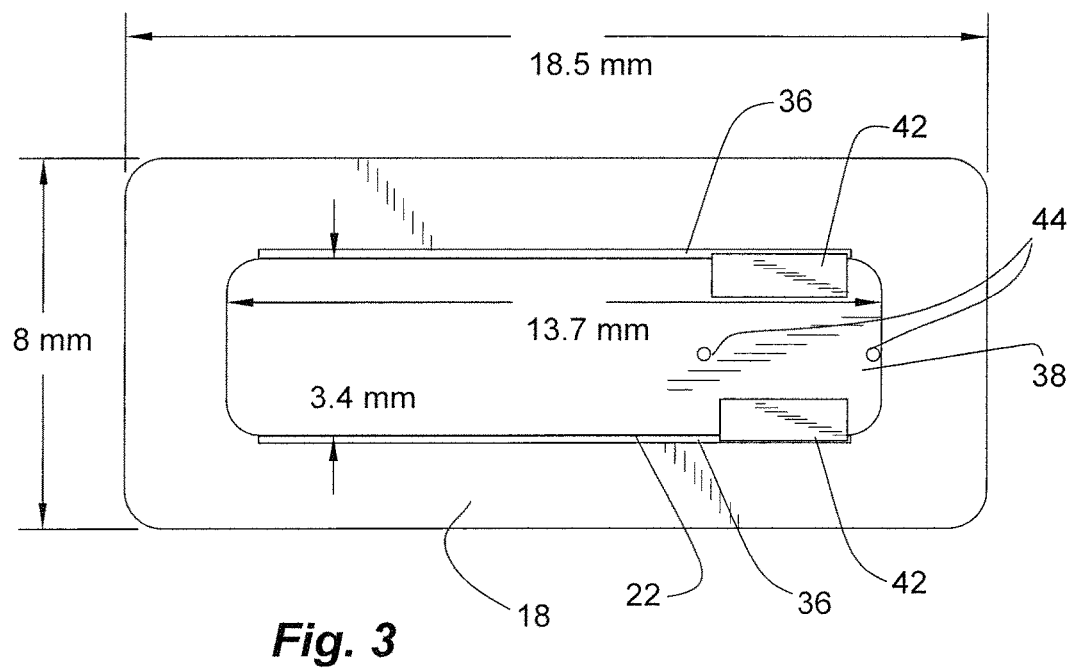
FIG. 3 is a rear view of the lens cover of FIG. 1.

In addition, the lens cover 10 comprises a slider 38 slidably coupled to the base 18 and disposed on the base. The base 18 can carry the slider 38. The slider 38 slides with respect to the base 18 between two positions, comprising: 1) an open position, and 2) a closed position. In the open position, the slider 38 is slid to expose the camera lens 34, as shown in FIGS. 2 and 5. In the closed position, the slider 38 is slid to cover the camera lens 34, as shown in FIGS. 1 and 4. The slider 38 has an exposed face 40 and an interior face abutting to the base 18 or outer surface thereof. In addition, the slider 38 has a pair of separate and discrete tabs 42 spaced-apart from one another and extending from the interior face of the slider 38 and into the pair of undercuts 36 of the base 22. The separate and discrete tabs 42 can facilitate manufacture and can facilitate maintaining tolerances during manufacture. The slider 38 can be formed of plastic and can be formed by injection molding. The tabs 42 in the undercuts 36 maintain the slider 38 on the base 18. In addition, the slider 38 can have a pair of stops 44 extending from the interior face of the slider 38 and positioned on opposite lateral sides of the pair of tabs 42. The stops 44 can abut to an interior perimeter of the base 14 or of the opening 22 thereof to limit travel of the slider 38. One stop 44 can abut to one side of the opening 22 in the closed position while the other stop 44 can abut to the opposite side of the opening 22 in the open position. The stops 44 can be separate and discrete from one another, and separate and discrete with respect to the tabs 42, to facilitate manufacture and to facilitate maintenance of tolerances during manufacture. The location of the stops 44 can be determined independently of the tabs 42. In addition, the stops 44 can resist the tabs 42 from abutting an end of the pair of undercuts 36, and thus can resist binding.

The lens cover 10, or the base 18 and the slider 38, can be thin to reduce interference with the operation of the mobile device. In one aspect, the lens cover 10 can have a thickness less than 2 mm in one aspect, less than 1.5 mm in another aspect, and less than 1.2 mm in another aspect.

In another aspect, lens cover 10, or the base 18 and the slider 38, can have an oblong, rectangular shape with rounded corners to resist snagging. In another aspect, the lens cover 10, or the base 18 and the slider 38, can be small to reduce interference with the operation of the mobile device. The base 18 or the base ring and the slider 38 can have matching perimeters in the closed position. Thus, the slider 38 conceals or covers the base 18 in the closed position, and can reduce the accumulation or dust, debris or lint. The base 18 and the slider 38 can have a length less than approximately 20 mm in one aspect, and less than approximately 19 mm in another aspect, and 18.5 mm in another aspect. The base 18 and the slider 38 can have a height less than or equal to 8 mm in one aspect. The base 18 and the slider 38 can have a length and a height with a ratio of approximately 19:8 in one aspect. The base 18 can have a surface area greater than approximately 100 mm$^2$ in one aspect, while the slider 38 can have a surface area less than approximately 150 mm$^2$ in one aspect. In one aspect, the opening 22 of the base 18 can have an area less than approximately 50 mm$^2$. The base 18 and the slider 38 can have surface areas with a ratio of 2:3. The base 18 or base ring can have a perimeter width, between the opening 22 and the perimeter, that is continuous between approximately 2.3 to 2.5 mm.

In another aspect, the slider 38 can comprise indicium 78 on the exposed face 40. The indicium 78 can be indicative of or represent a business, a product, or both. Thus, the lens cover 10 can be used as a promotional product. In one aspect, the indicium 78 can be printed on the exposed face 40 of the slider 38. The indicium 78 or the print can be raised with respect to the exposed face 40 of the slider 38 to facilitate grip with the user's finger. In another aspect, the indicium 78 can comprise a sticker with an adhesive layer adhered to the exposed face 40 of the slider 38. In another aspect, the indicium 78 can comprise a polyurethane dome label with indicia disposed under a translucent or transparent squat, flat dome adhered to the exposed surface of the slider 38. The polyurethane dome label can be tacky to facilitate a grip with the user's finger.

A method for selectively covering and exposing a camera lens 34 of a mobile device 14, and for using the lens cover 10 described above, comprises: securing a base 10 or a base ring on the mobile device 14 with an opening 22 of the base 18 or the base ring over and aligned with the camera lens 34, and with the base 18 or base ring circumscribing the camera lens 34; and selectively sliding the slider 38 between two positions, including: an open position and a closed position.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A lens cover configured to selectively cover and expose a camera lens on a mobile device, the lens cover comprising:
   a) a base with an inner side configured to be affixed to a back of the mobile device, the base having an opening configured to be aligned with the camera lens of the mobile device;
   b) a slider slidably coupled to the base and disposed on top of the base opposite the inner side of the base, the slider having an exposed face and an interior face abutting to the base; and
   c) the slider sliding with respect to the base between two positions, comprising:
      i) an open position configured to expose the camera lens; and
      ii) a closed position configured to cover the camera lens;
   d) a pair of undercuts opposing one another on opposite sides of the opening of the base; and
   e) a pair of separate and discrete tabs spaced-apart from one another and extending from the interior face of the slider and into the pair of undercuts of the base.

2. The lens cover in accordance with claim 1, further comprising:
   a) indicia on the exposed face of the slider; and
   b) the indicia being indicative of or representing a business, a product, or both.

3. The lens cover in accordance with claim 1, wherein the base and the slider have matching perimeters in the closed position.

4. The lens cover in accordance with claim 1, wherein the pair of undercuts are elongated and extend along a majority of the opening; and wherein the pair of tabs slide in the pair of undercuts.

5. The lens cover in accordance with claim 1, wherein the pair of undercuts extend under the base and on the inner side of the base.

6. The lens cover in accordance with claim 1, wherein the entire exposed face of the slider is exposed.

7. A lens cover configured to selectively cover and expose a camera lens on a mobile device, the lens cover comprising:
   a) a base with an inner side configured to be affixed to a back of the mobile device, the base having an opening configured to be aligned with the camera lens of the mobile device;
   b) a slider slidably coupled to the base and disposed on top of the base opposite the inner side of the base, the slider having an exposed face and an interior face abutting to the base;
   c) the slider sliding with respect to the base between two positions, comprising:
      i) an open position configured to expose the camera lens; and
      ii) a closed position configured to cover the camera lens;
   d) the base and the slider having matching perimeters in the closed position; and
   e) the base and the slider have a length less than approximately 20 mm and a height less than or equal to 8 mm.

8. The lens cover in accordance with claim 7, further comprising:
   a) indicia on the exposed face of the slider; and
   b) the indicia being indicative of or representing a business, a product, or both.

9. The lens cover in accordance with claim 7, wherein the base and the slider have perimeters with a length and a height with a ratio of approximately 19:8.

10. The lens cover in accordance with claim 7, wherein the base has a surface area greater than approximately 100 mm$^2$ and the slider has a surface area less than approximately 150 mm$^2$.

11. The lens cover in accordance with claim 7, wherein the opening of the base has an area less than approximately 50 mm$^2$.

12. The lens cover in accordance with claim 7, wherein the slider has a surface area less than 150 mm$^2$ and the opening in the base has an area less than 50 mm$^2$.

13. The lens cover in accordance with claim 7, wherein the base and the slider have surface areas with a ratio of 2:3.

14. The lens cover in accordance with claim 7, wherein the base comprises a base ring with a perimeter width that is continuous between approximately 2.3 to 2.5 mm.

15. The lens cover in accordance with claim 7, further comprising:
   a) a pair of undercuts opposing one another on opposite sides of the opening of the base; and
   b) a pair of separate and discrete tabs spaced-apart from one another and extending from the interior face of the slider and into the pair of undercuts of the base.

16. The lens cover in accordance with claim 7, wherein the pair of undercuts are elongated and extend along a majority of the opening; and wherein the pair of tabs slide in the pair of undercuts.

17. The lens cover in accordance with claim 7, wherein the pair of undercuts extend under the base and on the inner side of the base.

18. The lens cover in accordance with claim 7, wherein the entire exposed face of the slider is exposed.

19. A lens cover configured to selectively cover and expose a camera lens on a mobile device, the lens cover comprising:
   a) a base with an inner side configured to be affixed to a back of the mobile device and an opposite outer side, the base having an opening configured to be aligned with the camera lens of the mobile device;
   b) a slider slidably coupled to the base and disposed on top of the outer side of the base opposite the inner side of the base, the slider having an exposed face and an interior face abutting to the outer side of the base;
   c) the base and the slider having matching perimeters in the closed position;
   d) the slider sliding with respect to the base between two positions, comprising:
      i) an open position configured to expose the camera lens; and
      ii) a closed position configured to cover the camera lens;
   e) a pair of undercuts extending under the base in the inner side of the base, and opposing one another on opposite sides of the opening of the base; and f) a pair of separate and discrete tabs spaced-apart from one another and extending from the interior face of the slider and into the pair of undercuts of the base.

20. The lens cover in accordance with claim 19, wherein the entire exposed face of the slider is exposed.

\* \* \* \* \*